United States Patent
Schnipke

(10) Patent No.: US 9,616,517 B2
(45) Date of Patent: Apr. 11, 2017

(54) REMOVABLE WELDING TIP ASSEMBLY

(71) Applicant: Honda Motor Co., Ltd., Minato-ku, Tokyo (JP)

(72) Inventor: Kevin S. Schnipke, Prospect, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 961 days.

(21) Appl. No.: 13/925,995

(22) Filed: Jun. 25, 2013

(65) Prior Publication Data
US 2014/0374388 A1  Dec. 25, 2014

(51) Int. Cl.
| | | |
|---|---|---|
| *B23K 11/31* | (2006.01) | |
| *B23K 11/30* | (2006.01) | |
| *B23K 11/11* | (2006.01) | |

(52) U.S. Cl.
CPC .......... *B23K 11/312* (2013.01); *B23K 11/115* (2013.01); *B23K 11/3054* (2013.01); *B23K 11/3072* (2013.01); *B23K 11/314* (2013.01); *B23K 11/315* (2013.01)

(58) Field of Classification Search
CPC . B23K 11/312; B23K 11/314; B23K 11/3054; B23K 11/3072; B23K 11/115; B23K 11/315
USPC ............................................. 219/86.31, 86.8
See application file for complete search history.

(56) References Cited

U.S. PATENT DOCUMENTS

| | | | |
|---|---|---|---|
| 3,558,850 A * | 1/1971 | Leathers .............. | B23K 11/314 |
| | | | 219/116 |
| 4,256,947 A | 3/1981 | De Candia | |
| 4,551,903 A | 11/1985 | Bisiach | |
| 4,794,221 A | 12/1988 | Takabe et al. | |
| 4,910,373 A | 3/1990 | Fuse | |
| 5,380,978 A | 1/1995 | Pryor | |
| 5,548,096 A | 8/1996 | Akasaka et al. | |
| 5,582,747 A | 12/1996 | Sakai et al. | |
| 6,573,470 B1 * | 6/2003 | Brown ................. | B23K 11/256 |
| | | | 219/86.31 |
| 7,718,918 B2 * | 5/2010 | Spinella ............... | B23K 11/253 |
| | | | 219/110 |
| 2012/0055910 A1 * | 3/2012 | Sakai .................... | B23K 11/115 |
| | | | 219/127 |
| 2012/0241416 A1 * | 9/2012 | Sakamoto ............. | B23K 11/115 |
| | | | 219/91.2 |

* cited by examiner

*Primary Examiner* — Quang D Thanh
*Assistant Examiner* — Kuangyue Chen
(74) *Attorney, Agent, or Firm* — Arent Fox LLP

(57) ABSTRACT

A dummy weld apparatus including a dummy weld gun which allows a direct weld robot with a conventional weld gun to clamp down on the dummy weld gun to apply force and weld current for performing welding of workpieces of a first composition (e.g., aluminum). This arrangement allows the current provided by the conventional weld gun to flow through the dummy weld gun for welding the workpieces using weld tips dedicated to welding parts of the first composition, but also allows the dummy weld gun to be removed from the conventional weld gun to allow the conventional weld gun to performing welding operations on workpieces of a second composition (e.g., steel) using the original welding tips of the weld gun, avoiding material contamination of the tips.

22 Claims, 3 Drawing Sheets

REMOVABLE WELDING TIP ASSEMBLY

BACKGROUND

This application relates generally to an apparatus and method for welding metal components, and more specifically to an apparatus and method for spot welding a hybrid system comprising steel and aluminum using different welding tips avoiding cross contamination.

A problem is introduced when a weld gun is used for spot welding on a hybrid system which alternates between welding steel and aluminum materials. Such alternate welding using common welding tips can lead to undesirable cross contamination of the welding tips, greatly reducing the tip lifetimes and subsequent degradation of weld quality. Currently, the use of separate welding guns for alternating between the aluminum welding portion and the steel welding portion of the process to solve this problem is expensive due to the large number of welding guns necessary to support the welding operations, and thus is not an optimum solution.

SUMMARY

Provided are a plurality of example embodiments, including, but not limited to, an apparatus for welding workpieces, said apparatus comprising: a first arm assembly; a first dummy weld tip held by the first arm assembly; a second arm assembly; a second dummy weld tip held by the second arm assembly; and a supporting structure configured to form said first arm assembly and said second arm assembly into a dummy weld gun. In this case, the dummy weld gun is configured to weld workpieces using a compressive force and a welding current both transferred from a weld gun to the dummy weld gun.

Also provided is a system for welding workpieces, the system comprising a weld gun including: a support structure, a piston connected to the support structure, a first weld tip connected to the piston, and a second weld tip connected to the support structure. The weld gun is configured to directly weld first workpieces by putting the first weld tip and the second weld tip into contact with opposing sides of the first workpieces by action of the piston for welding the first workpieces by passing a current from the first weld tip to the second weld tip through the workpieces.

The above system also comprising a dummy weld gun including: a first arm assembly, a first dummy weld tip held by the first arm assembly, a second arm assembly, a second dummy weld tip held by the second arm assembly; and a dummy support structure configuring the first arm assembly and the second arm assembly into the dummy weld gun. The dummy support structure of the dummy weld gun is configured to insert the dummy weld gun into the weld gun for welding second workpieces using a compressive force transferred from the piston of the weld gun to the dummy weld gun to engage the first and second dummy weld tips with the second workpieces.

Furthermore, the above system is configured to supply a welding current transferred from the first weld tip of the weld gun to the first dummy weld tip of the dummy weld gun through the second workpieces to the second dummy weld tip of the dummy weld gun to the second weld tip of the weld gun. The dummy support structure of the dummy weld gun is further configured to retrieve the dummy weld gun from the weld gun allowing the weld gun to directly weld other first workpieces.

Further provided is a method of welding workpieces having different compositions, comprising the steps of:
providing a weld gun having first and second weld tips;
providing a dummy weld gun having first and second dummy weld tips;
placing a first workpiece of a first composition between the first and second weld tips;
placing the first and second weld tips into direct compressive contact with opposite sides of the first workpiece of the first composition;
welding the first workpiece of the first composition by passing a current through the first workpiece of the first composition using the first and second weld tips;
moving the dummy weld gun into position within the weld gun;
placing a second workpiece of a second composition different than the first composition between the first and second dummy weld tips;
placing the first and second weld tips into compressive contact with the first and second dummy weld tips causing the first and second dummy weld tips to be in compressive direct contact with opposite sides of the second workpiece of the second composition;
welding the second workpiece of the second composition by passing a current through the second workpiece of the second composition using the first and second dummy weld tips and the first and second weld tips; and
removing the dummy weld gun from within the weld gun for allowing the weld gun to directly weld other workpieces of the first composition.

Also provided are any of the above embodiments where the first workpieces are comprised of a first composition including one of steel or aluminum, and wherein the second workpieces are comprised of a second composition including the other of steel or aluminum.

Also provided are additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE EXAMPLE EMBODIMENTS

Provided is a dummy weld apparatus including a dummy weld gun which allows a direct weld robot with a conventional weld gun to clamp down on the dummy weld gun to apply force and current for performing welding of workpieces of a first composition. This arrangement allows the weld current provided by the weld gun to flow through the dummy weld gun for welding the workpieces using welding tips dedicated to welding parts of the first composition, and then allows the dummy weld gun to be removed from the weld gun to allow the weld gun to perform welding operations on workpieces of a second composition using the original welding tips of the weld gun, avoiding material contamination of the tips.

In at least one practical use, the dummy weld gun allows the weld gun to clamp down on the dummy weld gun to apply force and weld current for performing welding of aluminum parts. This arrangement allows the weld current provided by the weld gun to flow through the dummy weld gun for welding the aluminum parts using weld tips dedicated to aluminum welding, and then allows the dummy weld gun to be removed from the weld gun to allow the weld gun to perform steel welding operations using the original weld tips of the weld gun dedicated to steel welding.

In practice, the weld tips of the weld gun come in electrical and force contact with the weld tip assemblies of the dummy weld gun, which prevents the weld tips of the weld gun from contacting the aluminum parts being welded, as only the dummy weld gun tips are directly in contact with the aluminum parts. However, the tips of the weld gun can be used to directly weld steel components without use of the dummy weld gun, thereby avoiding tip contamination. Of course, different combinations of materials could be used, and there is no reason that the dummy welding apparatus cannot be used for welding steel workpieces whereas the weld gun is used for aluminum workpieces. Hence, the same weld gun and station can be used to weld workpieces of more than one composition through the use of the dummy weld apparatus. Furthermore, more than two different workpiece compositions could be accommodated by using more than one dummy weld gun, for example.

Figure 1:
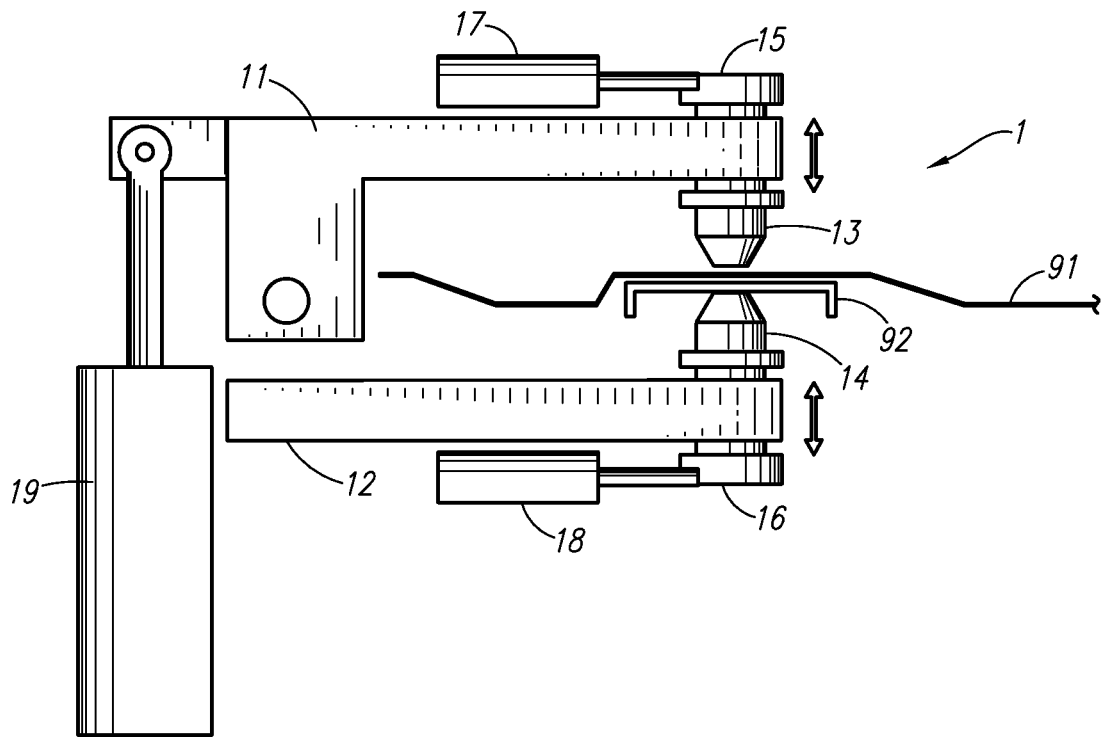
FIG. 1 is a side view of a drawing showing a first example embodiment of a dummy weld apparatus.

FIG. 1 shows a drawing for one example embodiment of a dummy weld apparatus or assembly 10. The dummy weld assembly 10 has a dummy weld gun 1 including an upper tip part 11 and a lower tip part 12 mounted together on an air cylinder 19. The upper tip part 11 holds an upper dummy weld tip 13 having a contact area 15, and an optional upper tip air cylinder 17 for partially rotating the dummy tip 13. The lower tip part 12 holds a lower dummy weld tip 14 having a contact area 16 and an optional lower tip air cylinder 18 for partially rotating the lower dummy tip 14. An upper workpiece part 91 and a lower workpiece part 92 are intended to be welded together using the dummy weld assembly 10. The dummy weld gun 1 is attached to a mount assembly including the air cylinder 19 for moving the dummy weld gun into and out of place for welding.

Figure 2:
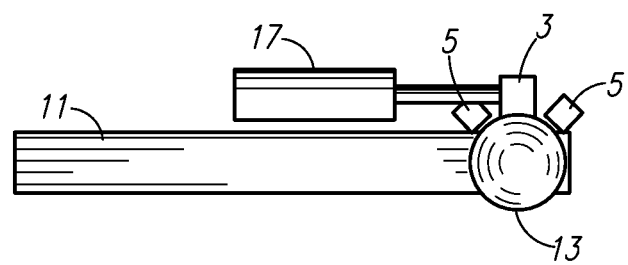
FIG. 2 is a top view of a drawing of a portion of the first example embodiment of the dummy weld apparatus.

FIG. 2 shows an example of how the optional upper tip air cylinder 17 can engage a tab 3 on the upper dummy tip 13 for rotating the dummy tip 13. Stops 5 are used to prevent rotation of the tip during a tip change. The optional upper and lower tip air cylinders 17, 18 can be used to provide a rotation of the dummy tips that may be desirable for use in disengaging the dummy tips from the workpieces in some circumstances. In such a situation, the dummy tips 13, 14 should be insulated at the location where the air cylinders 17, 18 contact the tips (e.g., on their sides) to avoid any electrical current from entering the air cylinders. However, the cylinders 17, 18 can be eliminated from some embodiments in order to reduce complexity and save costs.

Figure 3:
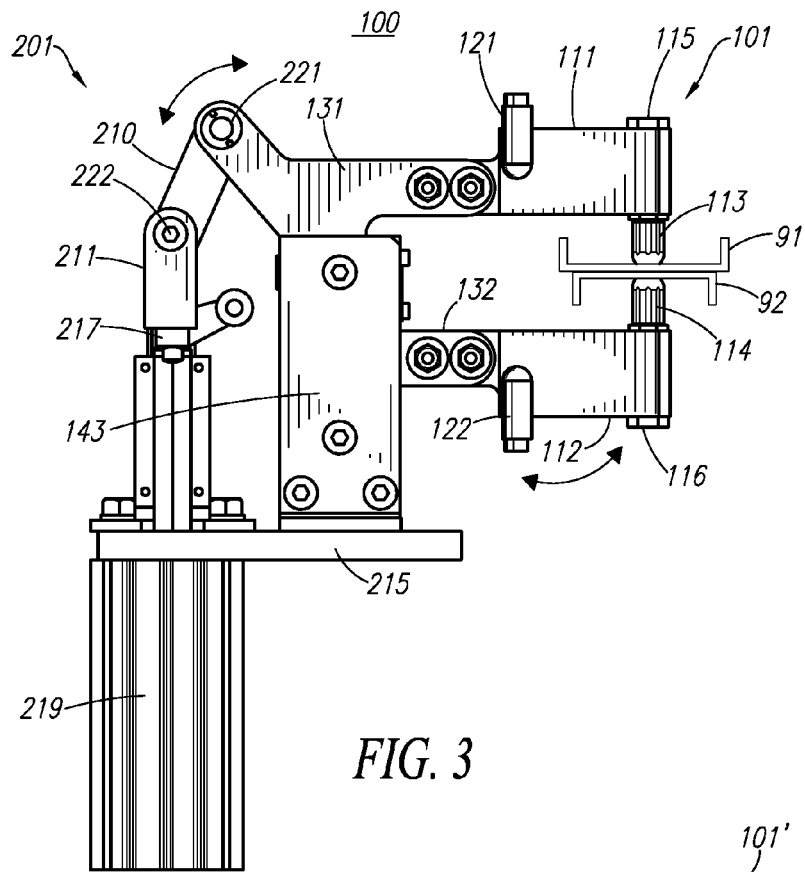
FIG. 3 is a schematic diagram showing a second example embodiment of a dummy weld apparatus.

FIG. 3 is a schematic drawing of an alternative dummy weld apparatus or assembly 100 that represents a modification of the first example dummy weld assembly 10, in that further structure is shown and this particular alternative assembly does not use the optional upper and lower tip air cylinders (but these could be added as a further option, if desired). As shown in FIG. 3, the dummy weld assembly 100 has a dummy weld gun 101 comprised of an upper tip part 111 and a lower tip part 112 mounted together on a mounting structure 201. The dummy weld gun 101 also includes an upper arm 131 and a lower arm 132 that are preferably made of a hard metal such as steel. The upper tip part 111 is attached to the upper arm 131 to form an upper arm assembly with the upper tip part 111 having a slot or hole for holding an upper dummy tip 113 having a contact area 115. The lower tip part 112 is attached to the lower arm 132 to form a lower arm assembly having a slot or hole for holding a lower dummy tip 114 having a contact area 116. Conventional welding tips made of copper can be used for the upper dummy tip 113 and lower dummy tip 114, but other compositions may be desirable for certain applications.

Water cooled tip holders 121, 122 can be optionally provided on the upper tip part 111 and lower tip part 112, respectively, to stabilize (minimize) tooling resistance of the dummy weld gun using a water flow to remove heat generated by the welding operation (described below). The dummy tips 113, 114 can also be water cooled as well, if desired. The use of water or coolant in practice is common to maintain a consistent medium to extract heat and, therefore, reduce resistance of the adjacent tooling. This, in effect, can provide a more stable process and consumable life improvement as well as improvement to weld quality.

The dummy weld gun 101 is connected to a supporting structure for moving the dummy gun into place for performing welding, and for aid in operating the welding process. For example, the supporting structure can include the mounting structure 201 comprising a connector rod 210 that is rotationally attached to an upper arm 131 via a first pivot 221 and that is rotationally connected to a post 211 of an air cylinder 219 via a second pivot 222. The pivots 221, 222 allow the upper arm 131 to stay level as the air cylinder 219 raises and lowers the dummy gun 101 and allow rotation of the upper arm 131 when the dummy tips 113, 114 are put into engagement with the workpieces 91, 92. The air cylinder 219 provides a linear force on the piston 217 that is transmitted to the post 211.

Figure 4:
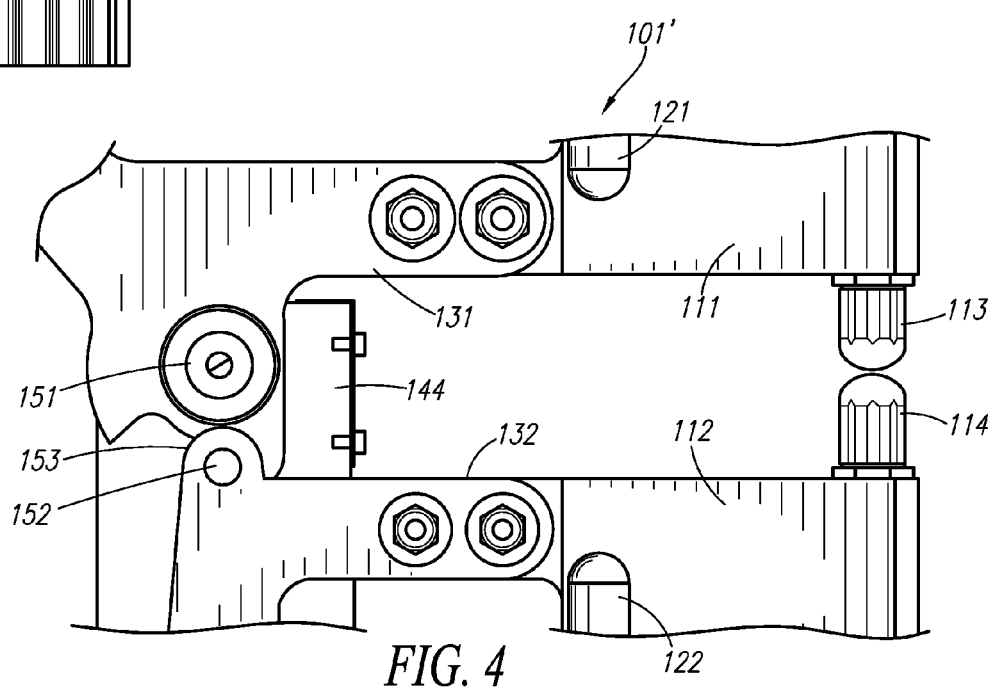
FIG. 4 is a schematic diagram showing a close-up of a portion of the second example embodiment of the dummy weld apparatus.

As the dummy weld gun 101 is raised or lowered by action of the air cylinder 219, a bottom of a first panel 143 engages a plate 215 of the mounting structure 201 to prevent the dummy gun 101 from being lowered too far. FIG. 4 shows a close up part of the dummy gun 101 with the first panel 143 removed, which exposes a second panel 144 and a lower pivot 152. The lower arm 132 rotates about the lower pivot 152, which then allows the lower arm 132 and hence the lower tip part 112 and lower dummy tip 114 to rotate in and out toward the lower workpiece 92 to engage and disengage the workpiece. A upper pivot 151 allows the upper arm 131 to rotate in conjunction with the pivots 221 and 222 as described above to engage and disengage the upper dummy tip 113 with the upper workpiece 91. Effectively, action of the air cylinder 219 helps disengage the upper and lower dummy tips 113, 114 from the welded workpieces 91, 92. A part 153 indicates a positive stop condition where the upper arm 131 applies force at the lower pivot 152 and then moves the lower arm 132 to a closed position. Likewise, in an opposite open position, the part 153 includes a positive stop to limit the open travel position of the upper arm 131.

Figure 5:
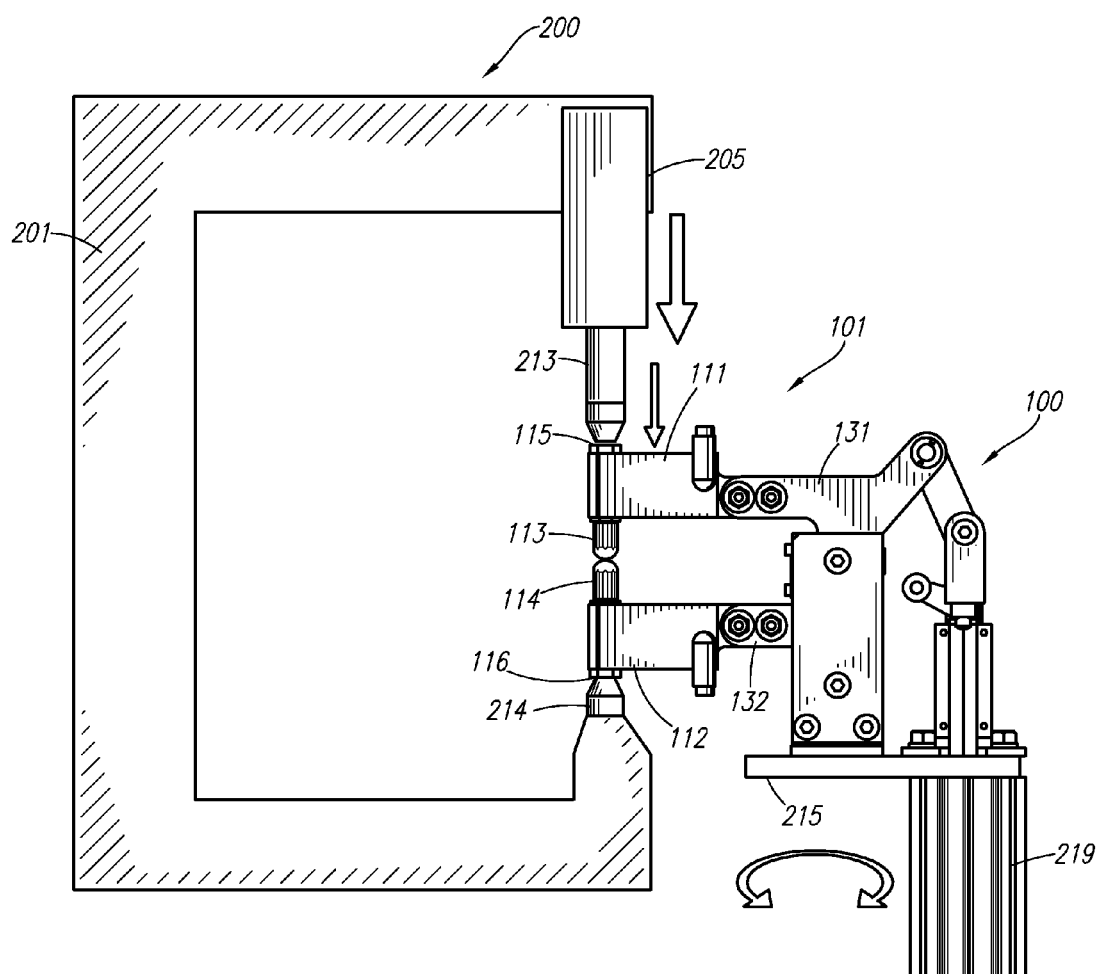
FIG. 5 is a schematic diagram showing the second example embodiment of the dummy weld apparatus in place for welding in a weld gun.

FIG. 5 shows an example of the dummy tip assembly 100 inserted into a robot weld gun 200. The robot weld gun 200 in this example has a C-body 201 and a piston 205 that pushes an upper weld tip 213 with a downward force. The robot weld gun 200 also has a lower weld tip 214. Conventionally, the weld tips 213, 214 would engage the upper and lower workpieces in order to weld them together using a weld current flowing through the weld tips 213, 214 and hence through the workpieces for performing the welding process. Welding tips made of copper can be used for the upper weld tip 213 and lower weld tip 214, but other compositions may be desirable for certain applications.

The robot weld gun 200 can be used in such a manner that when the dummy tip assembly 100 is removed from the robot weld gun 200, such as by rotating or translating the dummy weld gun out of the way, it can be used in the conventional sense. In this case, the robot weld gun 200 uses its own weld tips 213, 214 to weld the workpieces.

When the dummy weld gun 101 is placed into location within the robot weld gun 200, as shown in FIG. 5, the dummy weld gun can be used to weld workpieces using the dummy tips 113, 114. In this case, the piston 205 of the robot weld gun 200 is used to physically connect (compress) the weld tips 213, 214 of the weld gun 200 with the contact surfaces 115, 116 of the dummy tips 113, 114. This connection provides a conductive path for the weld current to flow through the dummy tips 113, 114 via the weld tips 213, 214. Furthermore, this connection also provides a downward force on the upper dummy tip 113 (as shown by the downward arrows), and hence ultimately provides a downward force on the upper arm 131 of the dummy gun 101, causing both the dummy tips 113, 114, to contact the workpieces to compress them together, and hence weld the workpieces to each other.

To ensure a good conductive path, the contact surfaces 115, 116, of the dummy tips must have conductive surfaces where they contact the weld tips 213, 214, respectively. Furthermore, it is beneficial to have the contact surfaces 115, 116 manufactured with relatively large surface areas to ensure adequate contact with the weld tips 213, 214, and with sufficient material toughness to avoid leaching and to endure the compressive force. Typically, the dummy tips 113, 114, like the weld tips 213, 214, are made of copper or a copper alloy, and when inserted into the upper tip part 111 and the lower tip part 112, they are electrically insulated from the respective tip parts, such as by using insulating bushings, for example.

In this manner, the weld gun 200 can be used to weld workpieces of one type composition (e.g., steel) when the dummy weld gun 101 is out of position (and out of the way of the workpieces), but the dummy weld gun 101 can be used to weld workpieces of another composition (e.g., aluminum) when the dummy gun 101 is placed in the working position within the weld gun 200 as shown in FIG. 5. This helps to prevent cross contamination of the welding tips, allowing each set of welding tips to be used only for one particular workpiece composition.

The dummy gun 101 can be moved into and out of position within the weld gun 200 by rotating the air cylinder 219, for example, or the entire dummy weld assembly 100 could be moved linearly away from the weld gun 200, for example, using a mobile platform on which the air cylinder 219 is mounted. For the design approach shown in FIG. 5, the retraction of the piston 205 does not actively retract the arms of the dummy weld gun 101. Thus, this embodiment relies on the air cylinder 219 to retract the dummy tips 113, 114 from the workpieces when welding is complete to separate the arms 131, 132, and hence to disengage the dummy tips 113, 114 from the welded workpiece, to enable removal of the welded workpiece from the dummy weld gun 101.

As suggested for the embodiment of FIGS. 1 and 2, an alternative embodiment of the dummy weld gun 1 can be provided with the upper and lower tip air cylinders 17, 18 to loosen the dummy tips in case of sticking issues. Furthermore, additional or alternative means of enabling separation of the dummy tips 113, 114 from the workpiece can also be provided, in particular in cases where tips sticking to workpieces are a problem.

Additional alternatives can also be provided by modifying the disclosed example embodiments. For example, the air cylinders described above could be operated by another gas, and thus could be generally pneumatic cylinders operating using air or any acceptable gas, or the air cylinders could be replaced with hydraulic cylinders using water or oil as a working fluid, or electrical equivalents could be used to perform the respective functions. Generally, any means of linearly operating a piston could be utilized.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. An apparatus for welding workpieces, said apparatus comprising:
   a weld gun comprising:
      a first weld tip and a second weld tip providing a welding current;
      a support structure for providing a compressive force by moving the first weld tip in at least a first direction towards the second weld tip; and
   a dummy weld gun comprising;
      a first arm assembly;
      a first dummy weld tip held by the first arm assembly;
      a second arm assembly;
      a second dummy weld tip held by the second arm assembly; and
      a supporting structure connecting the first arm assembly and the second arm assembly, wherein the first arm assembly allows at least the first dummy weld tip to move in at least the first direction toward the second dummy weld tip; and wherein said dummy weld gun welds workpieces using both the compressive force in at least the first direction and the welding current, wherein the welding current and compressive force are both transferred from the weld gun to the dummy weld gun.

2. The apparatus of claim 1, wherein said first dummy weld tip and said second dummy weld tip each include a corresponding flat portion.

3. The apparatus of claim 2, wherein the first weld tip and the second weld tip contact the flat portions of the first dummy weld tip and the second dummy weld tip, respectively, when the dummy weld gun is welding the workpieces.

4. The apparatus of claim 3, wherein a motion of a piston on the weld gun pushes the first weld tip into the first dummy weld tip to cause the first dummy weld tip to contact the workpieces during the welding of the workpieces to transmit the compressive force.

5. The apparatus of claim 1, where said supporting structure includes a pneumatic or hydraulic cylinder configured to enable the dummy weld gun to disengage from the workpieces.

6. The apparatus of claim 1, further comprising a cooling portion for cooling the dummy weld gun.

7. The apparatus of claim 1, further comprising a disengaging mechanism for disengaging the first dummy weld tip and the second dummy weld tip from the workpieces after said welding.

8. The apparatus of claim 7, wherein said disengaging mechanism includes at least one piston.

9. The apparatus of claim 8, wherein said at least one piston is configured to perform said disengaging by rotating at least one of said first dummy weld tip or said second dummy weld tip.

10. The apparatus of claim 1, wherein said supporting structure inserts said dummy weld gun into the weld gun for welding the workpieces, and wherein said supporting structure further retrieves said dummy weld gun from the weld gun allowing the weld gun to directly weld other workpieces.

11. The apparatus of claim 6, wherein the cooling portion is separate from a cooling weld gun cooling portion.

12. A system for welding workpieces, said system comprising:
   a weld gun including:
      a support structure,
      a piston connected to said support structure,
      a first weld tip connected to said piston, and
      a second weld tip connected to said support structure, wherein
      said weld gun directly welds first workpieces by putting said first weld tip and said second weld tip into contact with opposing sides of the first workpieces by action of the piston for welding the first workpieces by passing a current from the first weld tip to the second weld tip through the workpieces;
   a dummy weld gun including:
      a first arm assembly,
      a first dummy weld tip held by the first arm assembly,
      a second arm assembly,
      a second dummy weld tip held by the second arm assembly; and
      a dummy support structure positioning said first arm assembly and said second arm assembly into the dummy weld gun, wherein
   said dummy support structure of the dummy weld gun inserts the dummy weld gun into the weld gun for welding second workpieces using a compressive force transferred from the piston of the weld gun to the dummy weld gun to engage the first and second dummy weld tips with the second workpieces, and wherein
   said system supplies a welding current transferred from the first weld tip of the weld gun to the first dummy weld tip of the dummy weld gun through the second workpieces to the second dummy weld tip of the dummy weld gun to the second weld tip of the weld gun, and wherein
   said dummy support structure of the dummy weld gun retrieves said dummy weld gun from the weld gun allowing the weld gun to directly weld other first workpieces.

13. The system of claim 12, wherein the first dummy weld tip and the second dummy weld tip each include a corresponding flat portion, and wherein the first weld tip and the second weld tip contact the flat portions of the first dummy weld tip and the second dummy weld tip, respectively, when the dummy weld gun is welding the second workpieces.

14. The system of claim 12, where said dummy support structure of the dummy weld gun includes a piston that disengages the dummy weld gun from the second workpieces after said welding.

15. The system of claim 12, further comprising a cooling portion for cooling the dummy weld gun.

16. The system of claim 12, further comprising a disengaging mechanism that disengages the first dummy weld tip and the second dummy weld tip from the second workpieces after said welding.

17. The system of claim 16, wherein said disengaging mechanism includes at least one air cylinder.

18. The system of claim 16, wherein said disengaging mechanism rotates at least one of said first dummy weld tip or said second dummy weld tip.

19. The system of claim 12, wherein said first workpieces include one of steel or aluminum, and wherein said second workpieces include the other of steel or aluminum.

20. The system of claim 15, wherein the cooling portion is separate from a cooling weld gun cooling portion.

21. A method of welding workpieces having different compositions, comprising the steps of:
   providing a weld gun having first and second weld tips;
   providing a dummy weld gun having first and second dummy weld tips;
   placing a first workpiece of a first composition between the first and second weld tips;
   placing the first and second weld tips into direct compressive contact with opposite sides of the first workpiece of the first composition;
   welding the first workpiece of the first composition by passing a current through the first workpiece of the first composition using the first and second weld tips;
   moving the dummy weld gun into position within the weld gun;
   placing a second workpiece of a second composition different than the first composition between the first and second dummy weld tips;
   placing the first and second weld tips into compressive contact with the first and second dummy weld tips causing said first and second dummy weld tips to be in compressive direct contact with opposite sides of the second workpiece of the second composition;
   welding the second workpiece of the second composition by passing a current through the second workpiece of the second composition using the first and second dummy weld tips and the first and second weld tips; and
   removing the dummy weld gun from within the weld gun for allowing the weld gun to directly weld other workpieces of the first composition.

22. The method of claim 21, wherein said first composition includes one of steel or aluminum, and wherein said second composition includes the other of steel or aluminum.

\* \* \* \* \*